(12) United States Patent
Matsuo et al.

(10) Patent No.: US 12,515,277 B2
(45) Date of Patent: Jan. 6, 2026

(54) METHOD OF DETECTING CENTER COORDINATES OF SPOT WELDING MARK, LASER WELDING METHOD, AND BONDING METHOD

(71) Applicant: TOYOTA JIDOSHA KABUSHIKI KAISHA, Toyota (JP)

(72) Inventors: Ryuta Matsuo, Nagakute (JP); Takeshi Yamamoto, Nisshin (JP); Takashi Motoyoshi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 588 days.

(21) Appl. No.: 18/101,915

(22) Filed: Jan. 26, 2023

(65) Prior Publication Data
US 2023/0249289 A1     Aug. 10, 2023

(30) Foreign Application Priority Data
Feb. 10, 2022   (JP) ................................. 2022-019459

(51) Int. Cl.
*B23K 26/346* (2014.01)
*B23K 11/11* (2006.01)
(Continued)

(52) U.S. Cl.
CPC .......... *B23K 26/346* (2015.10); *B23K 11/115* (2013.01); *B23K 26/032* (2013.01);
(Continued)

(58) Field of Classification Search
CPC ......... B23K 11/11; B23K 11/15; B23K 26/03; B23K 26/032; B23K 26/035; B23K 26/04; B23K 26/042; B23K 26/21; B23K 26/22; B23K 26/346; B23K 28/02; B23K 2101/006
See application file for complete search history.

(56) References Cited

U.S. PATENT DOCUMENTS 10,549,388 B2 *  2/2020 Fujimoto ............... B23K 28/02
10,722,976 B2 *  7/2020 Naito ................. H01L 21/67144
(Continued)

FOREIGN PATENT DOCUMENTS

JP   2006205182 A  *  8/2006
JP   2019-126832 A      8/2019
WO   WO-2020205998 A1 * 10/2020 ......... G01N 21/8851

*Primary Examiner* — Alain Chau
(74) *Attorney, Agent, or Firm* — Sughrue Mion, PLLC

(57) ABSTRACT

A method of detecting center coordinates of a spot welding mark includes: a linear laser light emitting step of emitting a plurality of linear laser light components with a linear irradiation trace on a spot welding mark by emitting laser light through continuous output oscillation; a waveform acquiring step of acquiring a waveform of an intensity of return light which is light generated from a processing point; an outer edge position coordinates deriving step of deriving position coordinates of three or more points on an outer edge of the spot welding mark from a peak position of the intensity of the waveform of the return light; and a center coordinates calculating step of calculating center coordinates of the spot welding mark from the position coordinates of the three or more points on the outer edge derived in the outer edge position coordinates deriving step.

5 Claims, 5 Drawing Sheets

(51) Int. Cl.
*B23K 26/03* (2006.01)
*B23K 26/042* (2014.01)
*B23K 26/21* (2014.01)
*B23K 101/00* (2006.01)
*G01B 11/00* (2006.01)

(52) U.S. Cl.
CPC .......... *B23K 26/042* (2015.10); *B23K 26/21* (2015.10); *B23K 2101/006* (2018.08); *G01B 11/002* (2013.01)

(56) References Cited

U.S. PATENT DOCUMENTS

| | | | | |
|---|---|---|---|---|
| 11,660,705 | B2* | 5/2023 | Nakada | B23K 26/24 219/121.63 |
| 2015/0174702 | A1* | 6/2015 | Fujimoto | B23K 26/32 219/121.64 |
| 2017/0274473 | A1* | 9/2017 | Naito | B23K 26/067 |
| 2019/0329361 | A1* | 10/2019 | Nakada | B23K 26/24 |

* cited by examiner

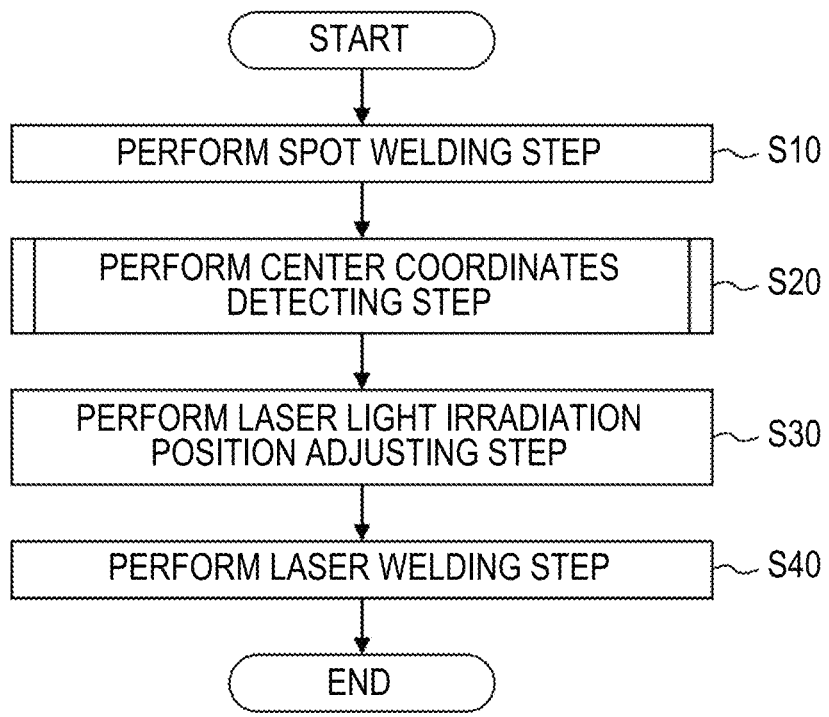
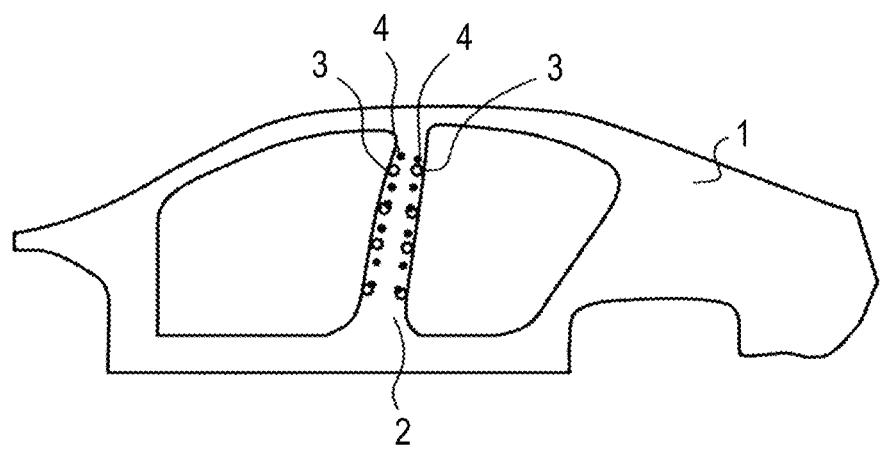

METHOD OF DETECTING CENTER COORDINATES OF SPOT WELDING MARK, LASER WELDING METHOD, AND BONDING METHOD

CROSS-REFERENCE TO RELATED APPLICATION

This application claims priority to Japanese Patent Application No. 2022-019459 filed on Feb. 10, 2022, incorporated herein by reference in its entirety.

BACKGROUND

1. Technical Field

The present disclosure relates to a method of detecting center coordinates of a spot welding mark, a laser welding method, and a bonding method.

2. Description of Related Art

For example, Japanese Unexamined Patent Application Publication No. 2019-126832 (JP 2019-126832 A) discloses a method of forming a circumferential welding mark by applying laser light in a circumferential shape such that an unwelded part remains in laser welding, ascertaining a center position of a welding mark from an image, and correcting the center position of laser irradiation.

SUMMARY

For example, when a plurality of metal plates is bonded in the course of manufacturing a vehicle, spot welding and laser welding may be used in combination. In this case, first, spot welding is performed, a plate gap which is a gap between the plurality of metal plates is appropriately filled and adjusted, and then laser welding is performed over the spot welding or at a position separated by a predetermined offset from the spot welding position.

When spot welding and laser welding are used in combination as described above, delicate control of a positional relationship between spot welding and laser welding is required. Particularly, when a spot welding process and a laser welding process are performed using different equipment in mass production, positions on products will be irregular according to the processes, the laser welding position may thus not be a desired position relative to the spot welding position, laser welding may be performed at a position at which the plate gap is excessively large or excessively small, and thus there is a problem with deterioration of welding quality.

In order to accurately identify a positional relationship between spot welding and laser welding, it is necessary to accurately ascertain center coordinates of a spot welding mark. In position accuracy inspection of spot welding or the like, it is necessary to accurately calculate center coordinates of spot welding, which has not yet been solved.

The present disclosure can be embodied as the following aspects.

(1) According to a first aspect of the present disclosure, there is provided a method of detecting center coordinates. The method of detecting center coordinates is a method of detecting center coordinates of a spot welding mark, the method including: a linear laser light emitting step of emitting a plurality of linear laser light components with a linear irradiation trace on a spot welding mark by emitting laser light through continuous output oscillation in a laser welding device in at least one of a direction from inside to outside of the spot welding mark and a direction from outside to inside of the spot welding mark; a waveform acquiring step of acquiring a waveform of an intensity of return light which is light generated from a processing point by emitting the laser light in the linear laser light emitting step; an outer edge position coordinates deriving step of deriving position coordinates of three or more points on an outer edge of the spot welding mark from a peak position of the intensity of the waveform of the return light; and a center coordinates calculating step of calculating center coordinates of the spot welding mark from the position coordinates of the three or more points on the outer edge derived in the outer edge position coordinates deriving step.

With the method of detecting center coordinates according to the first aspect, a waveform of an intensity of return light generated from a processing point by emitting laser light thereto is acquired in the linear laser light emitting step and the waveform acquiring step. In the outer edge position coordinates deriving step, position coordinates of three or more points on the outer edge of the spot welding mark are derived from the peak position of the intensity of the waveform of return light. In general, a shape in a plan view of a spot welding mark is substantially circular. Accordingly, in the center coordinates calculating step, the center coordinates of the spot welding mark can be accurately identified based on the position coordinates of the three or more points on the outer edge.

By applying the method of detecting center coordinates of a spot welding mark according to the first aspect to, for example, welding position accuracy inspection of spot welding or control of a positional relationship between spot welding and laser welding which is performed later, it is possible to improve quality of welding.

(2) According to a second aspect of the present disclosure, there is provided a laser welding method. The laser welding method includes: a laser light irradiation position adjusting step of adjusting an irradiation position of welding laser light based on the center coordinates of the spot welding mark detected in the method of detecting center coordinates according to the first aspect; and a laser welding step of performing welding by emitting the welding laser light.

With the laser welding method according to the second aspect, it is possible to accurately detect center coordinates with a spot welding mark. Since the irradiation position of laser light is adjusted based on the center coordinates of the spot welding mark in the laser light irradiation position adjusting step, it is possible to accurately maintain the positional relationship between the spot welding and the laser welding and to improve positional accuracy of the laser welding. It is possible to curb deterioration in quality of the welding in which the spot welding and the laser welding are combined.

(3) According to a third aspect of the present disclosure, there is provided a bonding method. The bonding method is a bonding method of bonding a plurality of metal plates using spot welding and laser welding, the bonding method including: a spot welding step of melting and bonding the metal plates by superimposing and holding the plurality of metal plates with a pair of electrodes using a resistance welding device and then pressurizing and supplying the pair of electrodes with electric power; a center coordinates detecting step of detecting the center coordinates of the spot welding mark formed on surfaces of the metal plates in the spot welding step using the method of detecting center coordinates according to claim 1 using a laser welding device; a laser light irradiation position adjusting step of adjusting an irradiation position of the welding laser light based on the center coordinates detected in the center coordinates detecting step; and a laser welding step of performing welding by emitting the welding laser light to the metal plates.

With the bonding method according to this aspect, since the center coordinates of the spot welding mark can be accurately detected in bonding a plurality of metal plates and the irradiation position of laser light is adjusted based on the center coordinates of the spot welding mark in the laser light irradiation position adjusting step, it is possible to accurately maintain the positional relationship between the spot welding and the laser welding and to improve welding accuracy.

(4) In the bonding method, an output value when the laser light is emitted in the linear laser light emitting step may be smaller than the output value when the welding laser light is emitted in the laser welding step. With the bonding method according to the third aspect, since laser light with an excessively large output value which is larger than the output value in the laser welding step is not emitted in the linear laser light emitting step, it is possible to reduce the output value such that the surfaces of the metal plates are appropriately melted and to maintain good welding quality.

(5) In the bonding method, the plurality of metal plates may be constituent members of a vehicle. With the bonding method according to this aspect, it is possible to perform bonding of a plurality of metal plates which are constituent members of a vehicle with good quality in the course of manufacturing a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a flowchart illustrating steps of a bonding method according to a first embodiment of the present disclosure;

FIG. 2 is a diagram schematically illustrating a configuration of vehicular members to be bonded in the bonding method according to the first embodiment of the present disclosure;

DETAILED DESCRIPTION OF EMBODIMENTS

A. First Embodiment

Bonding Method

Figure 3:
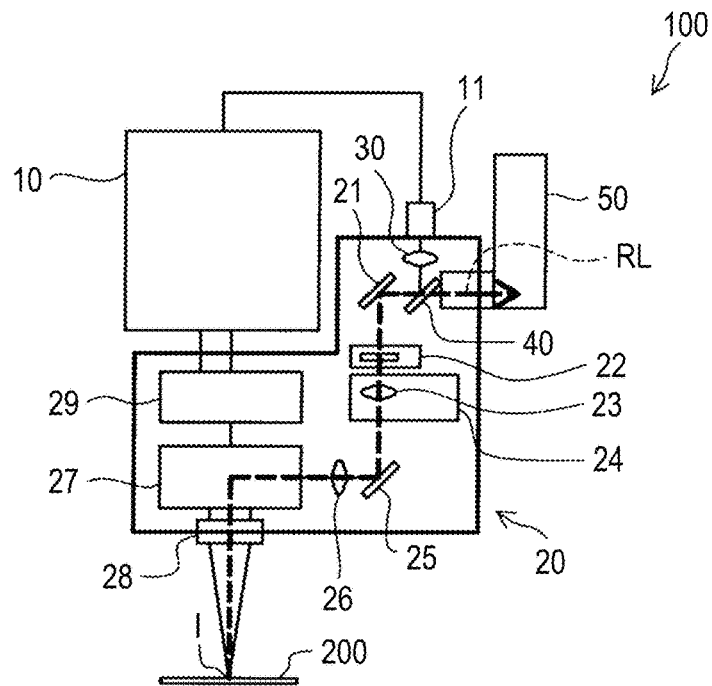
FIG. 3 is a diagram schematically illustrating a configuration of a laser welding device which is used for a method of detecting center coordinates of a spot welding mark, a laser welding method, and a bonding method according to the first embodiment of the present disclosure.

A method of detecting a center coordinate position of a spot welding mark, a laser welding method, and a bonding method according to the first embodiment of the present disclosure will be described below with reference to FIGS. 1 to 10. FIG. 1 is a flowchart illustrating steps of the bonding method according to the first embodiment of the present disclosure. The bonding method according to the first embodiment is a method which is used for bonding metal plates which are constituent members of a vehicle in the course of manufacturing the vehicle and includes a spot welding step (S10), a center coordinates detecting step (S20), a laser light irradiation position adjusting step (S30), and a laser welding step (S40) as illustrated in FIG. 1. These steps (S10, S20, S30, and S40) are sequentially performed.

FIG. 2 is a diagram schematically illustrating a configuration of vehicular members to be bonded in the bonding method according to the first embodiment of the present disclosure, and schematically illustrates a state in which spot welding and laser welding have been performed on a bonding position. The bonding method according to the first embodiment is applied to, for example, bonding to a reinforcement which is not illustrated in a part of a center pillar 2 of a side member 1 of a vehicle as illustrated in FIG. 2. The side member 1 and the reinforcement correspond to an example of "metal plates." In the following description, members to be bonded are also simply referred to as "metal plates." In FIG. 2, a spot welded part 3 is simply illustrated as a white circle, and a laser welded part 4 is simply illustrated as a black circle. The laser welded part 4 may be located to be superimposed on the spot welded part 3 or may be located at a position which is separated by a predetermined offset therefrom.

Hereinafter, steps of the bonding method according to the first embodiment will be described. The spot welding step (S10) is a step of filling and adjusting a gap between two members to be bonded (hereinafter referred to as a "plate gap") such that the plate gap has an appropriate value in order to maintain quality in the laser welding step (S40) which is performed later. That is, the spot welding step (S10) is a step of performing a so-called gap filling process.

In the spot welding step (S10), the metal plates are melted and bonded by superimposing and holding a plurality of metal plates with a pair of electrodes using a resistance welding device which is not illustrated and pressurizing and supplying the pair of electrodes with electric power. A known resistance spot welding device can be used, which is not illustrated. A molten part is formed in the superimposed part of the stacked members by supplying the electrodes with electric power. The molten part is cooled and solidified to form a welded part. Two members are bonded by the spot-shaped welded part (a so-called nugget) formed in this way. In general, the shape in a plan view of the welded part is substantially circular.

In the center coordinates detecting step (S20), the center coordinates of the spot welding mark which is formed in the spot welding step (S10) are detected using a laser welding device. A configuration of a laser welding device 100 which is used in the center coordinates detecting step (S20) and the laser welding step (S40) which is performed later will be first described below. FIG. 3 is a diagram schematically illustrating a configuration of the laser welding device 100 which is used for the method of detecting center coordinates of a spot welding mark, the laser welding method, and the bonding method according to the first embodiment of the present disclosure.

Configuration of Laser Welding Device 100

The laser welding device 100 includes a laser oscillator 10 and a galvano-scanner 20 as illustrated in FIG. 3. The laser oscillator 10 is connected to the galvano-scanner 20 via an optical fiber connector 11. A collimator lens 30 is provided in the galvano-scanner 20. The galvano-scanner 20 includes a first reflecting mirror 21, a diffraction optical element (DOE) 22, a Z lens 23, a Z lens driving unit 24, a second reflecting mirror 25, a condensing lens 26, a galvano-scanner unit 27, a cover glass 28, and a galvano-scanner driver 29. A return light detector 50 along with a dichroic mirror 40 is attached to the galvano-scanner 20.

When laser light is emitted from the laser oscillator 10, the laser light enters the galvano-scanner 20 via the optical fiber connector 11. Then, the laser light is adjusted to a parallel state by the collimator lens 30. Thereafter, the laser light is reflected by the dichroic mirror 40 and the first reflecting mirror 21 and reaches the DOE 22.

The DOE 22 can adjust an irradiation pattern of laser light. Specifically, the DOE 22 can emit laser light incident thereon as laser light having a power density distribution shape which is different from that at the time of incidence thereon. The DOE 22 is attached to a sliding portion and is configured to be slid.

The laser light adjusted by the DOE 22 reaches the Z lens 23. The Z lens 23 is used to correct defocus of laser light. The Z lens 23 is driven to move by the Z lens driving unit 24.

Thereafter, the laser light is reflected by the second reflecting mirror 25, is incident on the galvano-scanner unit 27 via the condensing lens 26, and exits to the surface of a workpiece 200 via the cover glass 28. A welding mark can be formed on the surface of the workpiece 200 by the exiting laser light.

The galvano-scanner driver 29 is connected to the laser oscillator 10, the Z lens driving unit 24, and the galvano-scanner unit 27 and is configured to control them in accordance with a program stored therein. Accordingly, it is possible to control an output power of laser light, an irradiation position, and the like using the galvano-scanner driver 29. Since control can be performed in this way, the laser welding device 100 is configured to operate automatically in accordance with a program.

The return light detector 50 detects light (hereinafter referred to as "return light") which is generated and returned from a processing point I because the temperature of the processing point I is a high temperature higher than 1000° C. when metal is melted by irradiation with laser light. The return light appropriately passes through the second reflecting mirror 25, the first reflecting mirror 21, the dichroic mirror 40, and the like and is incident on the return light detector 50 as indicated by a dotted line RL in FIG. 3. The return light detector 50 detects light of a predetermined frequency band (for example, 800 nm to 1000 nm) which is selected based on a type of laser light in advance and converts the light intensity thereof to a voltage value. The return light detector 50 can acquire change of the voltage value with the elapse of time as a waveform of light intensity. An example of the waveform of return light will be described later along with the center coordinates detecting step (S20) which will be described later.

The aforementioned configuration of the laser welding device 100 is only an example, and the laser welding device 100 may have a different configuration as long as it can perform the methods according to this embodiment which will be described below.

Method of detecting center coordinates

Figure 4:
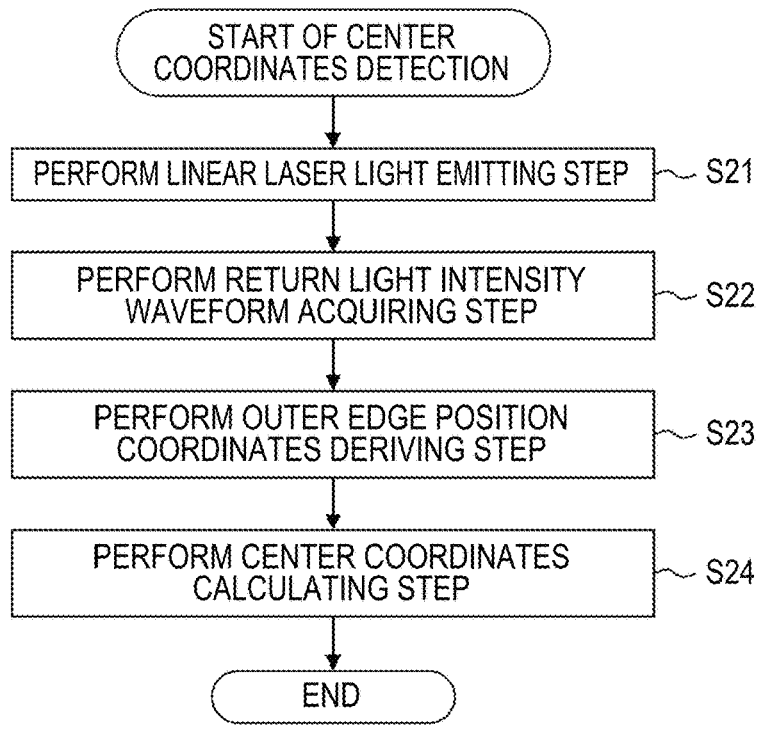
FIG. 4 is a flowchart illustrating a detailed routine of a center coordinates detecting step.

The center coordinates detecting step (S20) which is performed using the aforementioned laser welding device 100 will be described below. In the center coordinates detecting step (S20), center coordinates of a spot welding mark formed on the surface of the metal plates in the spot welding step (S10) are detected. FIG. 4 is a flowchart illustrating a detailed routine of the center coordinates detecting step (S20). As illustrated in FIG. 4, the method of detecting center coordinates includes a linear laser light emitting step (S21), a return light intensity waveform acquiring step (S22), an outer edge position coordinates deriving step (S23), and a center coordinates calculating step (S24).

Figure 5:
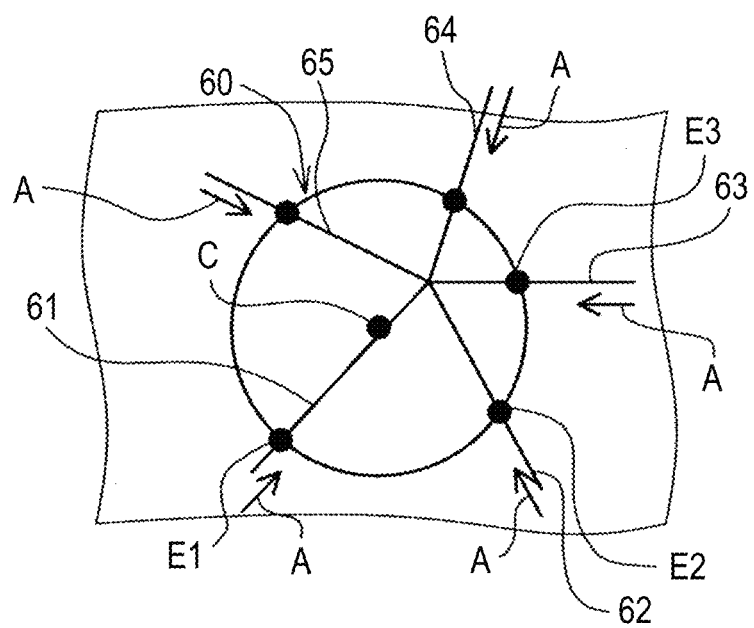
FIG. 5 is a diagram illustrating the center coordinates detecting step and a plan view schematically illustrating a state in which a spot welding mark is irradiated with a plurality of linear laser light components.

FIG. 5 is a diagram illustrating the center coordinates detecting step (S20) and a plan view schematically illustrating a state in which a spot welding mark 60 is irradiated with a plurality of linear laser light components 61, 62, 63, 64, and 65. In the linear laser light emitting step (S21), by emitting laser light through continuous output oscillation in the laser welding device 100 from outside to inside of the spot welding mark 60 as indicated by an arrow A in FIG. 5, the spot welding mark 60 is irradiated with a plurality of linear laser light components 61, 62, 63, 64, and 65 with a linear irradiation trace. In the example illustrated in FIG. 5, five linear laser light components 61, 62, 63, 64, and 65 are emitted.

Here, an output value when laser light is emitted in the linear laser light emitting step (S21) is set to be smaller than the output value when welding laser light is emitted in the laser welding step (S40). This is because there is concern about deterioration in quality and an appropriate return light waveform cannot be acquired when laser light is emitted with a higher output than that in the laser welding step (S40) which is main welding and penetrates the top metal plate. Accordingly, the output value of laser light in the linear laser light emitting step (S21) is set to such an output value that the surfaces of the top metal plate is appropriately melted.

The lengths of the linear laser light components 61, 62, 63, 64, and 65 are set to, for example, the same length as the diameter of the spot welding mark 60 such that the laser light reliably reaches the inside of the spot welding mark 60 from the outside. Irradiation start positions of the linear laser light components 61, 62, 63, 64, and 65 are set to positions which are outside of the spot welding mark 60 and which are appropriately separated from the outer edge of the spot welding mark 60. The lengths of the plurality of linear laser light components 61, 62, 63, 64, and 65 may be the same or may be different. In the example illustrated in FIG. 5, five linear laser light components 61, 62, 63, 64, and 65 are emitted such that they cross each other at the same point, but the disclosure is not limited thereto.

Figure 6:
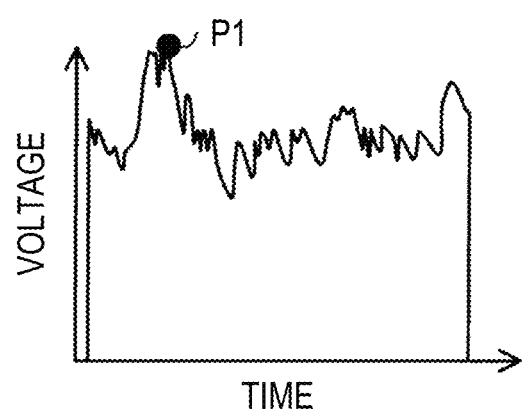
FIG. 6 is a diagram illustrating a waveform of return light which is acquired by a return light detector.
Figure 7:
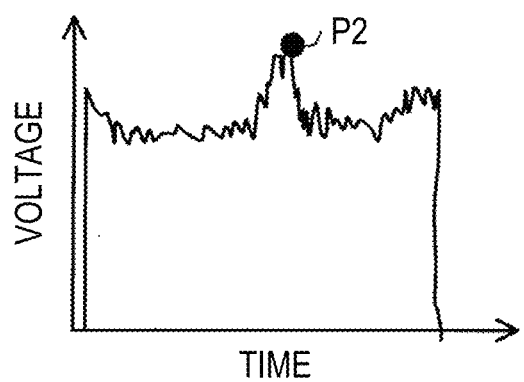
FIG. 7 is a diagram illustrating a waveform of return light which is acquired by the return light detector.
Figure 8:
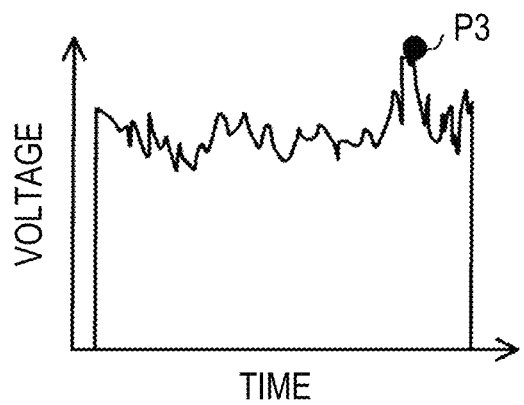
FIG. 8 is a diagram illustrating a waveform of return light which is acquired by the return light detector.

In the return light intensity waveform acquiring step (S22), a waveform of the intensity of the return light is acquired. FIGS. 6 to 8 are diagrams illustrating a waveform of return light acquired by the return light detector 50. FIG. 6 illustrates a waveform of return light which is generated when a first laser light component 61 in FIG. 5 is emitted. FIG. 7 illustrates a waveform of return light which is generated when a second laser light component 62 in FIG. 5 is emitted. FIG. 8 illustrates a waveform of return light which is generated when a third laser light component 63 in FIG. 5 is emitted. In FIGS. 6 to 8, the horizontal axis represents a time and the vertical axis represents a voltage value.

In the flowchart illustrated in FIG. 4, the linear laser light emitting step (S21) and the return light intensity waveform acquiring step (S22) are different processes and thus are individually described for the purpose of convenience, but the waveform of the intensity of return light is actually performed substantially at the same time as emission of the linear laser light components 61, 62, 63, 64, and 65.

Then, in the outer edge position coordinates deriving step (S23), position coordinates at a plurality of points E1, E2, and E3 (see FIG. 5) on the outer edge of the spot welding mark 60 are derived from peak positions (a position P1 in FIG. 6, a position P2 in FIG. 7, and a position P3 in FIG. 8) of a plurality of waveforms acquired in the return light intensity waveform acquiring step (S22). The inventor has known that the voltage value of the return light temporarily become larger when laser light passes through the outer edge of the spot welding mark 60, that is, when laser light enters a protruding portion of the surface protruding due to the spot welding mark 60, by continuously emitting laser light from outside to inside of the spot welding mark 60. Accordingly, a position corresponding to a peak of the voltage value in the waveform of the intensity of return light is a position on the outer edge of the spot welding mark 60.

Since a period of time from emission start to a peak of the voltage value can be acquired based on the waveform of the intensity of return light and an emission distance and an emission speed at which laser light is emitted are control parameters and are known, the position coordinates at which the voltage value has a peak can be derived, for example, as two-dimensional coordinates defined by an X axis and a Y axis parallel to the metal plate and perpendicular to each other.

Then, in the center coordinates calculating step (S24), the center coordinates (X and Y coordinates of the center C) of the spot welding mark 60 are calculated from the position coordinates of the plurality of points E1, E2, and E3 on the outer edge of the spot welding mark 60 derived in the outer edge position coordinates deriving step (S23). As described above, the shape in a plan view of the spot welding mark 60 is substantially circular. Accordingly, the center coordinates can be calculated using a quadratic function of a circle based on the position coordinates of three arbitrary points on the outer edge. In this embodiment, the center coordinates are calculated based on the position coordinates of three points E1, E2, and E3 on the outer edge. In order to calculate the center coordinates, at least three linear laser light components out of the linear laser light components 61, 62, 63, 64, and 65 need to be emitted and at least three waveforms of return light and at least three points on the outer edge need to be detected. Since a peak of the voltage value with noise due to disturbance added thereto may not be read, four or more (for example, five) linear laser light components may be emitted and three waveforms of which a peak can be clearly read may be selected in order to reliably acquire waveforms in which a peak of the voltage value can be read.

The bonding method will be described below with reference back to FIG. 1. After the center coordinates of the spot welding mark 60 has been detected in S20 as described above in detail, the laser light irradiation position adjusting step (S30) is performed, and the irradiation positions of laser light are adjusted based on the center coordinates detected in the center coordinates detecting step (S20). Specifically, for example, when it is intended to perform laser welding together with spot welding, the irradiation positions of laser light are adjusted to match the center coordinates detected in the center coordinates detecting step (S20) and are set again. When it is intended to perform laser welding at a position which is separated by a predetermined distance from the spot welding, the irradiation positions with laser light are adjusted such that an offset from the center coordinates detected in the center coordinates detecting step (S20) is equal to the predetermined distance.

Figure 9:
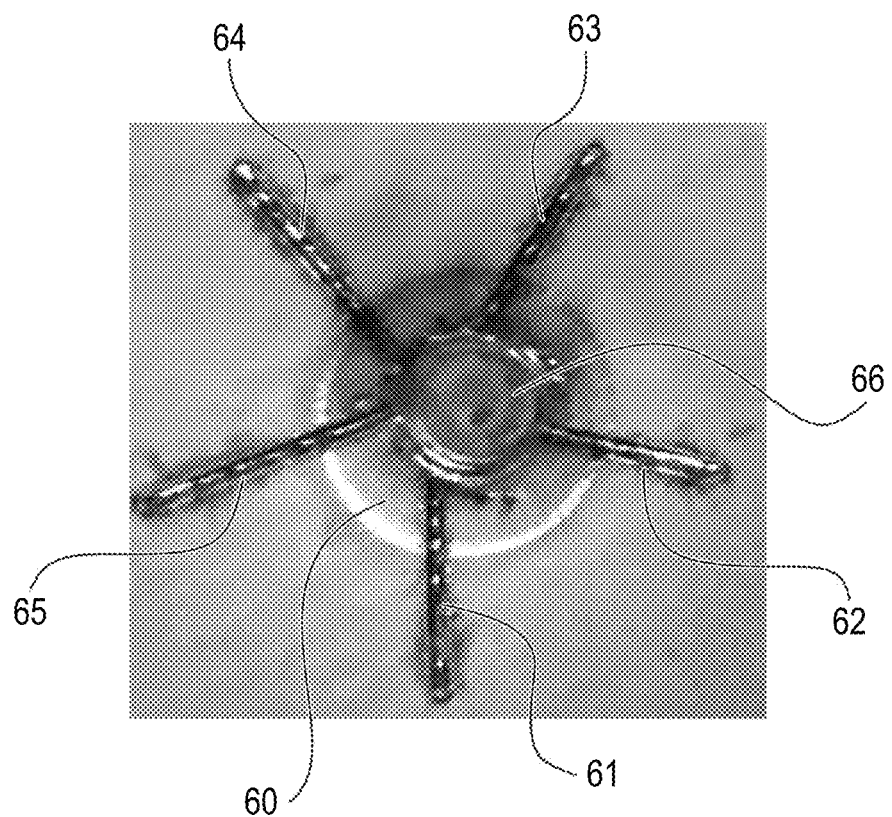
FIG. 9 is a diagram illustrating a surface of a metal plate which has been welded with laser welding superimposed on spot welding using the bonding method and the laser welding method according to the first embodiment.

FIG. 9 is a diagram illustrating a surface of metal plates which have been welded with laser welding superimposed on spot welding using the method of detecting center coordinates of a spot welding mark 60, the laser welding method, and the bonding method according to the first embodiment, where an image captured as a plan view of a welded part is illustrated. With the method which is performed by adjusting an irradiation position in laser welding based on the center coordinates of the spot welding mark 60 as illustrated in FIG. 9, a laser welding mark 66 and the spot welding mark 60 can be superimposed as desired, the laser welding mark 66 does not depart from the spot welding mark 60, and thus it is possible to perform welding with good quality.

Advantages (1) With the method of detecting center coordinates of a spot welding mark 60 according to the first embodiment, the coordinates of the center C of the spot welding mark 60 can be calculated after position coordinates of a plurality of points E1, E2, and E3 on the outer edge of the spot welding mark 60 have been derived based on waveforms of return light acquired at the time of irradiation with linear laser light. Accordingly, it is possible to accurately detect the center coordinates of the spot welding mark 60.

(2) With the laser welding method and the bonding method according to the first embodiment, laser welding can be accurately performed at a predetermined position set for the spot welding mark 60 after a plate gap has been adjusted through spot welding.

Figure 10:
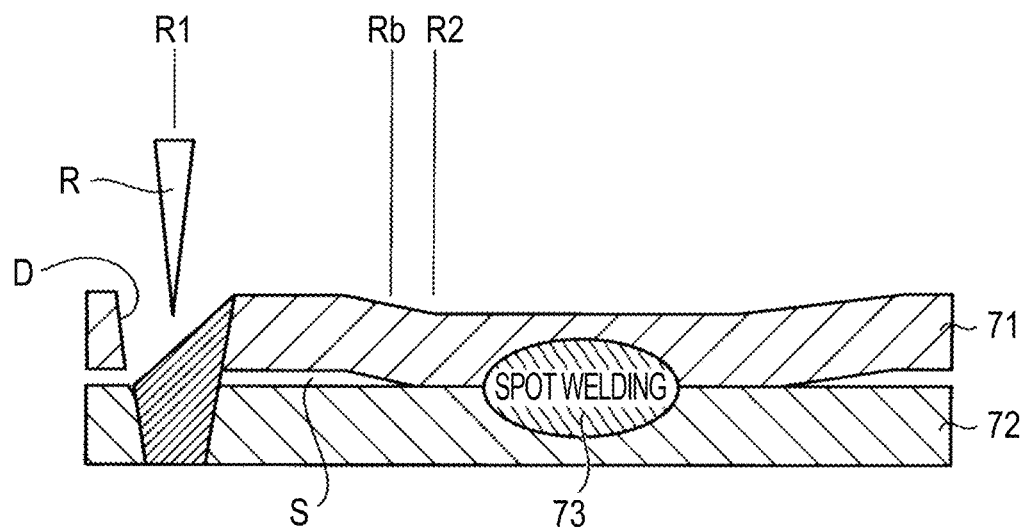
FIG. 10 is a cross-sectional view schematically illustrating a spot welding step and a laser welding step.

FIG. 10 is a diagram illustrating the spot welding step (S10) and the laser welding step (S40) and is a cross-sectional view schematically illustrating a cross section of a plurality of (two) metal plates 71 and 72 taken along a current supply direction of spot welding as an example. For example, when an irradiation position R1 with laser light R is deviated from a target position Rb and is excessively far from a position of spot welding (a nugget 73) as illustrated in FIG. 10, a portion with an excessively large plate gap may be irradiated with laser light, welding may be insufficient due to the excessively large plate gap, and a welding defect D may be caused. In FIG. 10, an example of the welding defect D is schematically illustrated.

When an irradiation position R2 of laser light R is deviated from the target position Rb and is too close to the position of the spot welding (the nugget 73) contrary to the above description and the metal plates 71 and 72 are, for example, galvanized metal plates, zinc staying on the side of the nugget 73 is gasified all at once and exploded by the spot welding and holes are formed to cause a welding defect. Since zinc does not stay just above the nugget 73, it can be irradiated with laser light.

Particularly, in mass production in the course of manufacturing a vehicle, the spot welding step (S10) and the laser welding step (S40) are generally performed as separate steps using different equipment, the welding position is affected by unevenness in product position in the steps (S10 and S40), a tool holding a product, or the like and is deviated from the desired position Rb as a result, laser welding may be performed at a position with an excessively large or small plate gap, and thus there is concern about deterioration in welding quality.

As described above, galvanized metal plates are exemplified as the metal plates 71 and 72, and management of the plate gap in bonding metal plates formed of other materials is also important for avoiding a welding defect. Since the plate gap S differs depending on a distance from the spot welding, delicate control of a positional relationship between spot welding and laser welding is required. In this regard, according to the first embodiment, the center coordinates of the spot welding mark 60 can be accurately detected and laser welding is performed after the irradiation position in laser welding has been adjusted based on the center coordinates of the spot welding mark 60. Accordingly, laser welding can be performed at a desired position relative to the spot welding mark 60, that is, a position at which the plate gap S is appropriately managed, and it is possible to improve welding quality.

(3) In the laser welding method and the bonding method according to the first embodiment, the output value when laser light is emitted in the linear laser light emitting step (S21) is set to be smaller than the output value when welding laser light is emitted in the laser welding step (S40). Accordingly, since laser light with an excessively large output value which is larger than the output value in the main bonding is not emitted in the linear laser light emitting step (S21), it is possible to reduce the output value such that the surfaces of the metal plates are appropriately melted and to maintain good welding quality.

B. Other Embodiments (B1) The bonding method according to the first embodiment is applied to bonding between the side member 1 and the reinforcement in a part of the center pillar 2 of a vehicle in the course of manufacturing the vehicle, but is not limited to bonding of the part. In the course of manufacturing a vehicle, there are many situations in which a plurality of metal plates is bonded, and thus the aforementioned bonding method can be appropriately applied. For example, the bonding method may be applied to bonding in the vicinity of a flange of a door opening of the side member 1, or the bonding method may be applied to bonding in a joint between the side member 1 and a roof or the like. The bonding method may be used in the course of repairing a vehicle instead of the course of manufacturing a vehicle.

(B2) The members to be bonded may not be constituent members of a vehicle, and the disclosure is not limited to a bonding method used in the course of manufacturing a vehicle. The bonding method can be applied to any method as long as it is a method of bonding two or more members using laser welding after spot welding.

(B3) The spot welding step (S10) in the bonding method according to the first embodiment is described above as a step of performing a so-called gap filling process, but the disclosure is not limited thereto. The spot welding step (S10) may be a process of strongly bonding a plurality of metal plates in combination with the laser welding step (S40).

(B4) The method of detecting center coordinates according to the first embodiment is used to adjust the irradiation position of laser light in the later laser welding step (S40), but may be used for another usage. For example, the center coordinates may be detected to ascertain positional accuracy of the spot welding, that is, to inspect to what accuracy welding can be performed at a desired position.

(B5) in the linear laser light emitting step (S21) in the method of detecting center coordinates according to the first embodiment, laser light is emitted from outside to inside of the spot welding mark 60, but laser light may be emitted from inside to outside of the spot welding mark 60 as long as a position on an outer edge of the spot welding mark 60 can be detected based on the return light intensity waveforms. A specific example of measurement wavelengths of return light to be selected is about 1070 nm in irradiation from inside to outside and is about 800 nm or 1070 nm in irradiation from outside to inside.

The present disclosure is not limited to the aforementioned embodiment, and can be embodied in various forms without departing from the gist of the present disclosure. For example, technical features in the embodiment corresponding to technical features in the aspects described in the SUMMARY can be appropriately exchanged or combined to solve some or all of the aforementioned problems. The technical features can be deleted unless they are described to be essential in this specification.

What is claimed is:

1. A method of detecting center coordinates of a spot welding mark, the method comprising:
    a linear laser light emitting step of emitting a plurality of linear laser light components with a linear irradiation trace on a spot welding mark by emitting laser light through continuous output oscillation in a laser welding device in at least one of a direction from inside to outside of the spot welding mark and a direction from outside to inside of the spot welding mark;
    a waveform acquiring step of acquiring a waveform of an intensity of return light which is light generated from a processing point by emitting the laser light in the linear laser light emitting step;
    an outer edge position coordinates deriving step of deriving position coordinates of three or more points on an outer edge of the spot welding mark from a peak position of the intensity of the waveform of the return light; and
    a center coordinates calculating step of calculating center coordinates of the spot welding mark from the position coordinates of the three or more points on the outer edge derived in the outer edge position coordinates deriving step.

2. A laser welding method comprising:
    a laser light irradiation position adjusting step of adjusting an irradiation position of a welding laser light based on the center coordinates of the spot welding mark detected in the method of detecting center coordinates according to claim 1; and
    a laser welding step of performing welding by emitting the welding laser light.

3. A bonding method of bonding a plurality of metal plates using spot welding and laser welding, the bonding method comprising:
    a spot welding step of melting and bonding the metal plates by superimposing and holding the plurality of metal plates with a pair of electrodes using a resistance welding device and then pressurizing and supplying the pair of electrodes with electric power;
    a center coordinates detecting step of detecting the center coordinates of the spot welding mark formed on surfaces of the metal plates in the spot welding step using the method of detecting center coordinates according to claim 1 using a laser welding device;

a laser light irradiation position adjusting step of adjusting an irradiation position of a welding laser light based on the center coordinates detected in the center coordinates detecting step; and a laser welding step of performing welding by emitting the welding laser light to the metal plates.

4. The bonding method according to claim 3, wherein an output value when the laser light is emitted in the linear laser light emitting step is smaller than the output value when the welding laser light is emitted in the laser welding step.

5. The bonding method according to claim 3, wherein the plurality of metal plates is constituent members of a vehicle.

* * * * *